United States Patent [19]

Makiyo et al.

[11] Patent Number: 4,920,236
[45] Date of Patent: Apr. 24, 1990

[54] SEALING CABLE JUNCTIONS

[75] Inventors: Minoru Makiyo, Yachimata; Shigenori Goto; Hiroshi Yokosuka, both of Sakura, all of Japan; Robert L. Curtis, Trowbridge; Philip J. Wade, Somerset, both of United Kingdom

[73] Assignees: Fujikura Ltd., Tokyo, Japan; ALH Systems Limited, Wiltshire, United Kingdom

[21] Appl. No.: 326,402

[22] Filed: Mar. 20, 1989

Related U.S. Application Data

[63] Continuation of Ser. No. 112,911, Oct. 23, 1987, abandoned.

[30] Foreign Application Priority Data

Oct. 24, 1986 [GB] United Kingdom ............... 8625479
Jan. 21, 1987 [JP] Japan ............................ 62-11697
Aug. 5, 1987 [GB] United Kingdom ............... 8718535

[51] Int. Cl.$^5$ .................... H02G 15/08; H01R 43/00
[52] U.S. Cl. .................... 174/77 R; 24/457; 156/49; 156/86; 174/72 R; 174/93; 174/DIG. 8; 403/273; 428/34.9
[58] Field of Search ............... 174/72 R, 93, 77 R, 174/DIG. 8; 156/49, 51, 52, 53, 54, 55, 56, 86, 85; 264/230, 342 R; 206/568; 428/34.9, 913; 403/273, 344; 24/339, 457

[56] References Cited

U.S. PATENT DOCUMENTS

| | | | |
|---|---|---|---|
| 4,085,286 | 4/1978 | Horsma et al. | 174/92 |
| 4,490,426 | 12/1984 | Franckx | 174/72 R |
| 4,590,328 | 5/1986 | Kunze | 174/77 R X |
| 4,647,716 | 3/1987 | Akiyama et al. | 174/77 R |
| 4,648,924 | 3/1987 | Nolf | 174/DIG. 8 X |
| 4,680,065 | 7/1987 | Vansant et al. | 174/DIG. 8 X |
| 4,685,683 | 8/1987 | Hall et al. | 264/342 R X |
| 4,689,474 | 8/1987 | Overbergh et al. | 174/DIG. 8 X |
| 4,693,767 | 9/1987 | Grzanna et al. | 174/DIG. 8 X |

FOREIGN PATENT DOCUMENTS

| | | |
|---|---|---|
| 0110705 | 11/1983 | European Pat. Off. . |
| 0120603 | 2/1984 | European Pat. Off. . |
| 0127457 | 5/1984 | European Pat. Off. . |
| 0151512 | 1/1985 | European Pat. Off. . |
| 3012401 | 10/1981 | Fed. Rep. of Germany . |
| 2414263 | 8/1979 | France . |
| 1604986 | 1/1978 | United Kingdom . |
| 2019120 | 10/1979 | United Kingdom . |
| 2086669 | 1/1985 | United Kingdom . |

OTHER PUBLICATIONS

Excerpt Licentia Patent-Verwaltungs-GmbH; Clip for Heat-Recoverable Sleeve Body—3 pages (no date).

Primary Examiner—Morris H. Nimmo
Attorney, Agent, or Firm—Sprung Horn Kramer & Woods

[57] ABSTRACT

To seal a cable junction, an insert is placed between two branch cables of the junction, which is then enclosed by a heat shrinkable envelope. The insert has at least one insert part having a block of heat fusible material attached by one or more flanges of heat conductive material to the branch cables. The block lies between the branch cables at least partially inside the envelope. Then, when the envelope is heated to cause it to shrink, the block fuses, thus forming a seal. For most sizes of branch cables, two insert parts may be used, but three or more may be used for large branch cables. The flange preferably has a tongue extending into the block to assist heat conduction.

30 Claims, 9 Drawing Sheets

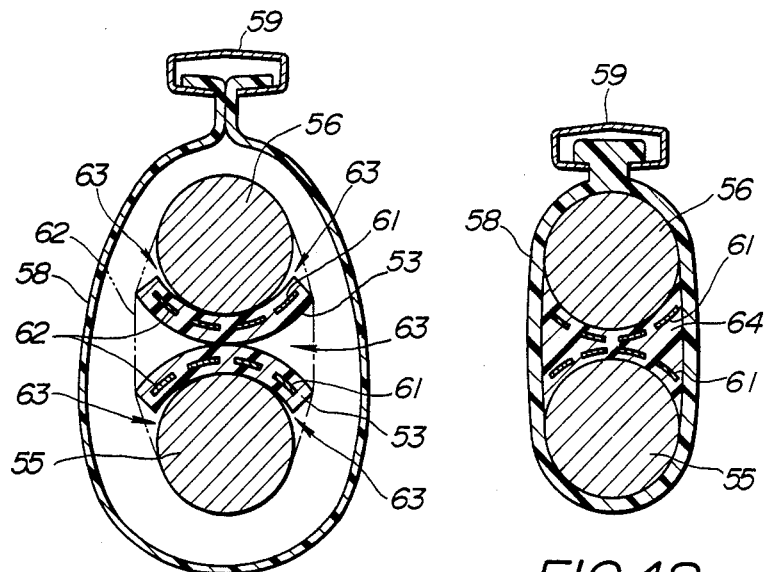
FIG.12
FIG.13
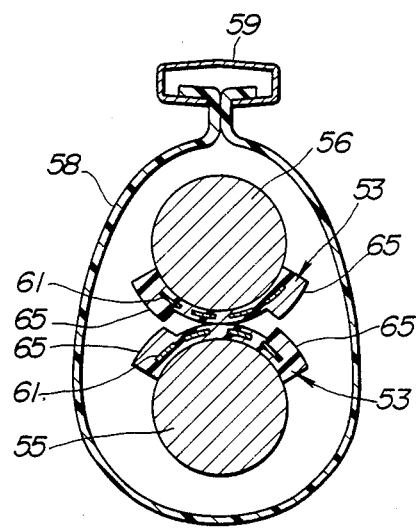
FIG.14

SEALING CABLE JUNCTIONS

This application is a continuation-in-part, continuation, of application Ser. No. 112,911, filed 10/23/87 now abandoned.

BACKGROUND OF THE INVENTION

1. Field of the Invention

The present invention relates to the sealing of cable junctions when it is desired to form a gas-tight enclosure around the junction, and when the means for supplying that enclosure is an envelope of heat shrinkable material. The present invention relates to a method of sealing such a cable junction, and also to a device for use in such a method.

The present invention may be used, for example, in the sealing of branch junctions of electric or communication cables.

SUMMARY OF THE PRIOR ART

Where two or more branch cables emerge from an enclosure in which they are sealed, there is a problem of ensuring sealing between the cables as they emerge from one side of the junction. The problem is, of course, that as the material forming the envelope shrinks, it will tend to draw part from the volume between the branches of the cables, and will not readily seal or bond to it.

This problem has been met in the past by clipping together the material of the heat-shrinkable envelope between the branches to form an indented conformation which is forcibly held by the clip at least until the assembly is stable after each shrinkage treatment (usually heat-shrinkage). Thus, the clip resists the tendency of the material to draw apart. An example of such sealing of a cable junction is shown in FIGS. 1 to 3 of the accompanying drawings. Referring to those figures, a cable junction 1 has branch cables 2, 3 extending from one end 4 thereof. The branch junction is surrounded with an envelope 5 of e.g. heat-shrinkable material, which normally includes a heat-shrinkable outer layer and a fusible inner layer. When heat is applied to the envelope 5, the sleeve shrinks radially inwards and its inner surface fuses to the cable junction, thereby sealing it. As discussed above, in order to prevent the parts of the envelope 5 surrounding the branch cables 2 and 3 from moving apart, a U-shaped clip 6 is fitted over the free end of the envelope, between the branch cables 2, 3. The clip 6 has a pair of generally parallel legs 7 connected together by a connecting part 8. FIG. 2 shows in more detail how the legs 7 of the clip hold the envelope 5 together between the branch cables 2, 3, and FIG. 3 shows the general shape of the clip in more detail.

The clip 6 is made of heat resistant material, so that it is not affected by the heat used to shrink the envelope. This arrangement has the advantage that the parts of the envelope 5 between the leg 7 of the clip will be fused together at a region 9, so that the clip 6 can be removed once the seal has been formed, if desired.

However, it can be seen that gaps 10 are formed between the region 9 and the branch cables 2, 3, so that complete sealing is not achieved. Furthermore, if the clip is not placed so that its axis of symmetry coincides with the axis 11 joining the centres of the branch cables 2, 3, the size of the gaps 10 may be increased. A further problem is that the envelope material is greatly deformed at the region 9 between the legs of the clip, and there is the risk that it may crack.

Therefore, a further arrangement that has been proposed is to provide a shaped insert within the sleeve, as shown in FIG. 4 of the accompanying drawings. In that figure, the envelope 5 and the branch cables 2, 3 are the same as those in FIGS. 1 to 3, and an insert 20 is fitted between the branch cables 2, 3. This insert 20 has curved recesses 21, 22 which receive the branch cables 2, 3 and also contains means 24 for heating the material of the insert 20. When the envelope 5 is heat-shrunk around the branch cables 2, 3, the insert 20 is also heated by the heating means 24, and thereby the insert 20 is sealed both to the inner surface of the envelope 5, and also to the branch cables 2, 3.

However, this arrangement has the disadvantage that a large volume of material is necessary to form the inert 20, and therefore the heating means 24 must be an "active" means such as resistance wire. The overall dimensions of the junctions are also normally large than that provided by the system of FIGS. 1 to 3.

SUMMARY OF THE INVENTION

The present invention seeks to provide a satisfactory seal with an arrangement which is more simple than that of FIG. 4. It proposes that the insert be formed by one or more insert parts, each of which comprises a heat conductive flange and a block of hot melt adhesive material. At its simplest, one such insert part is then placed between the two branch cables with the block lying between those cables. The flange is then wrapped around one of the branch cables to hold the insert part in place. The insert part is positioned so that the block extends into the sleeve. When heat is applied to the sleeve to cause it to shrink, heat is also applied to the flange which is conducted to the block, causing it to melt. Thus, the block material will seal to the branch cables and also to the inner surfaces of the sleeve to form a satisfactory seal.

As described above, only a single insert part is used. However, for most sizes of branch cables, it is preferable to use two such insert parts which are then placed with their blocks adjacent one another between the two branch cables, and the flange off each insert part wrapped around a corresponding one of the branch cables. The advantages for this is that, since two flanges are present, there is more heat conducted into the blocks.

A variation on this is for a single insert part to be used, but which has two flanges. Then one flange is wrapped around one branch cable, and the other around the other cable. The block in all these cases may be a simple rectangular shape, but it is also possible to have more complex shapes in order to provide a sufficient amount of material.

In order to provide satisfactory heat conduction into the block, it is preferable that the flange has a tongue projecting therefrom which extends into the block. In order to achieve satisfactory bonding of the block to this tongue, the tongue may have through-holes therein through which block material passes, thereby securing the block to the tongue. A further possibility is that the tongue has heat sensitive material (e.g. heart sensitive paint) which displays when the flange has reached the desired temperature. In order to facilitate the application of heat thereon, the flange may comprise projecting portions which extend in both directions perpendicular to the longitudinal axis of the tongue, the flange and the tongue forming generally a T shape. A further possibility is that the projecting portion are deformed concavely along its direction of extension to the corresponding branch cable.

One difficulty with the present invention is ensuring that sufficient heat is conducted into the block from the flange. It has been found that this problem acts as a limit to the size of the block that may be connected to any given flange, and this causes problems when the branch cables have a large diameter. The reason for this is that for such large cables a large amount of block material must be provided in order to fill the spaces within the cable. For large cables, the use of two insert parts is generally not sufficient, and more are needed. Where there are three or more insert parts, only the outer two need be secured to the branch cables, although it is also possible to secure others provided that their flanges are positioned so that they can be heated satisfactorily.

As mentioned above, there is normally a tongue extending from the flange into the block which conducts heat into the interior of the block. However, to melt peripheral parts of the block this heat must then be conducted through the block material itself. When the volume of the block is large this heat conduction may be insufficient to melt the edges of the block. This is particularly important since it is those edges which first encounter the shrinking envelope, and therefore should be melted first. Therefore, in a further development of the present invention, the block has a central region, at least a part of which has a first thickness in a direction perpendicular to the flange and the tongue, and outer regions on either side of the central region (in a direction in the plane of the tongue and the flange) which are thinner than the central region. Since those outer regions are thinner, they require less heat to soften them, and by suitable selection of their width and thickness they will be able to deform with the shrinking of the envelope. Preferably, the central region itself has a central thinner part, since it is not necessary for there to be a large volume of material directly between the branch cables. This is particularly true when three or more insert parts a provided.

To increase heat conduction further, it is further possible to include one or more collapsible heat-conducting members (e.g. meshes or foils) in the block. The heat conducting member(s) improve conduction within the block (particularly to parts remote from the tongue) and thus enable easy melting of the block.

Normally, the block of the insert part(s) extend outwardly of the tangential lines joining the branch cables, and therefore will be compressed as the shrinkable material of the envelope bends to conform to those tangential lines. The blocks will preferably be formed with the material of slightly higher melt-flow index and lower melting point then the heat-shrink envelope material and the polymeric sheathing of the branch cables. This is to ensure that when the heat-shrink material starts to recover during the application of heat, the blocks of the insert parts will have fused and are therefore capable of being deformed by the shrinking envelope. The fitting of the insert parts may be preceded by the application to the surface of the branch cables of a layer of sealant material identical to that of the blocks of the insert parts. This layer would be bonded of the branch cables by applying heat prior to the fitting of the insert parts. In this way, heat is required during the shrink-down process only to fuse the insert parts to the bonded sealant, rather than the increased heat required to bond the block material to the branch cables.

Where the block material is a standard heat-fusable resin, the initial dimensions of the block should be large enough to project beyond the theoretical tangential lines, as discussed above. However, it is possible to use an expandible insert which has an initial configuration which does not extend beyond the theoretical tangential lines, but which is expanded, preferably during the shrinking of the envelope. The eventual size of the block is then such that, in the absence of the envelope, it extends beyond the theoretical tangential lines, but since the envelope will limit such expansion, it can be ensured that the expanding material fills the entire space within the shrunk envelope around the branch cables. A suitable material for making such an expandible block for an insert part would be dinitrosopentametaylene tetramine (DNPT), although some inorganic carbonate/bicarbonate salts and other organic azo, nitrozo, and hydrazide compounds could also be utilized.

BRIEF DESCRIPTION OF THE DRAWINGS

Embodiments of the invention will now be described, by way of example, with reference to the accompanying drawings, in which:

FIG. 12 shows a cross-sectional view of the arrangement of FIG. 10, prior to shrinkage of the envelope;

FIG. 13 shows a view similar to FIG. 12, but after shrinkage of the envelope;

FIG. 14 shows a view similar to FIG. 12, but in which the insert part has been modified;

DETAILED DESCRIPTION

Figure 5:
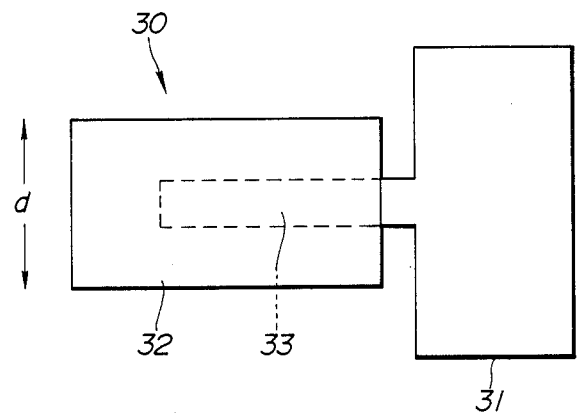
FIG. 5 shows a first embodiment of an insert part according to the present invention for sealing a cable branch junction.

A first embodiment, presently preferred, of the present invention will first be described with reference to FIGS. 5 to 8. In this embodiment an insert for sealing two branch cables comprises two insert parts generally in a T-shape and includes a flange 31 each as shown in FIG. 5. The insert part 30 has a T-shaped flange 31 of heat-conductive material, e.g. aluminium which is connected at its central position to a block 32 of resilient material, e.g. a thermoplastic material such as polyethylene, (PVC) and associated copolymers of either polyethylene or PVC, through a tongue 33, the free end of which tongue 33 is embedded in the block 32. The flange 31 is relatively thin and so is deformable so that the flange 31 can be deformed concavely to the cable. The block 32 may also be thin, although its volume is determined by the amount of material needed to fill the space between the envelope and the branch cables.

Figure 6:
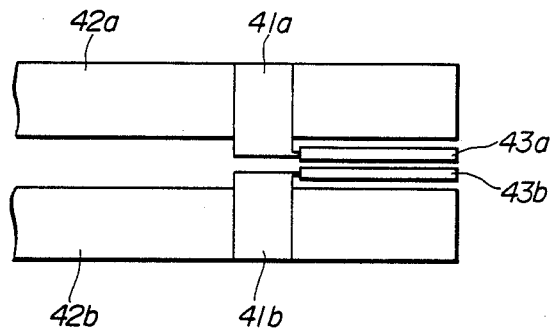
FIG. 6 shows two insert parts as illustrated in FIG. 5 fitted between two branch cables.
Figures 7, 8:
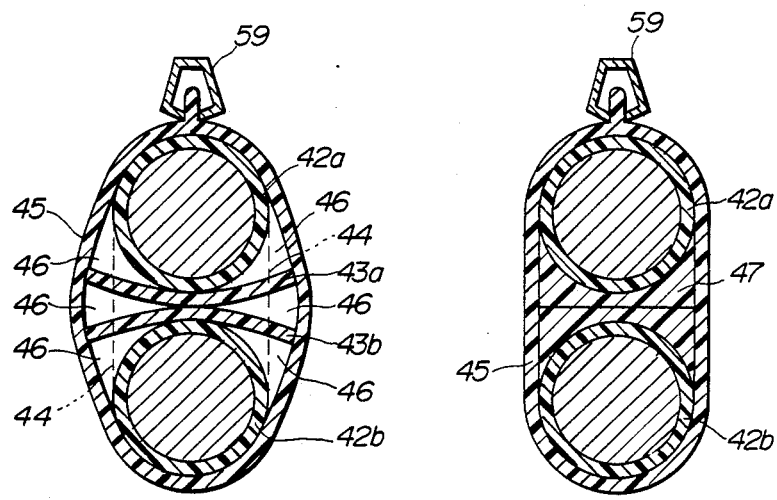
FIG. 7 shows the insert parts and two branch cables of FIG. 6 enclosed in a shrinkable envelope.
FIG. 8 shows the insert parts and branch cables of FIG. 6 with the envelope shrunk to its final position.

To fit the insert parts to two branch cables to be aligned and sealed, two insert parts as shown in FIG. 5 are placed between the two branch cables, with the plane of the insert parts (the plane seen in plan in FIG. 5) tangential to the branch cables. Then, as shown in FIG. 6, flanges 41a, 41b are each wrapped around the corresponding one of the branch cables 42a, 42b so that the insert parts are secured to the branch cables 42a, 42b. The flanges 41a and 41b in FIG. 6 correspond to the flange 31 in Fig. 5 and the blocks 43a and 43b in FIG. 6 correspond to block 32 in FIG. 5. It would also be possible, of course, to warp the flanges 41a, 42b around the branch cables 42a, 42b and then place the branch cables 42a, 42b in the position shown in FIG. 6. The flange 41a, 41b may be simply deformed concavely in the direction of corresponding branch cables 42a, 42b so that an excessive heat may not be applied to the branch cables 42a, 42b when the flanges 41a, 41b are heated. In either case, the blocks 43a, 43b of the insert parts then lie between the two branch cables 42a, 42b and extend generally tangentially of those branch cables 42a, 42b as shown in FIG. 7. FIG. 7 also illustrates that the width (dimension D in FIG. 5) is chosen so that is greater than the distance between the theoretical tangential lines 44 joining the branch cables 42a, 42b. A support means generally in a cylindrical form made of a heat and mechanical load resistance material such as metal may be placed to hold the junction before it is surrounded by the envelope 45 made of a heat shrinkable material.

Figure 1:
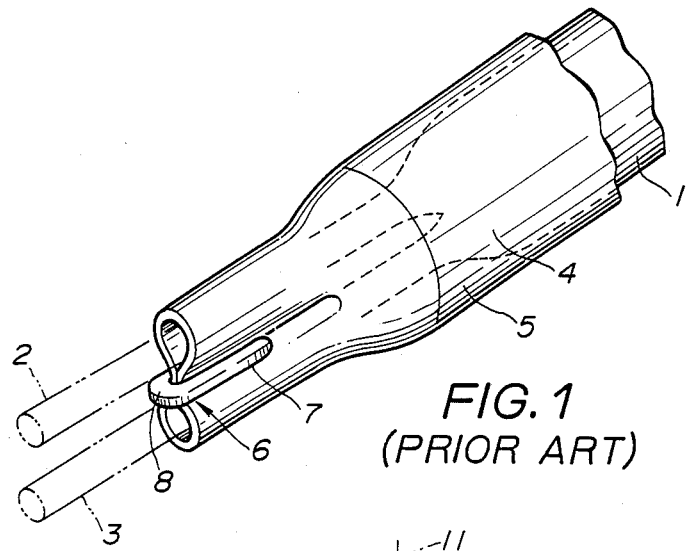
FIGS. 1 to 3 show a first known system for sealing a cable branch junction, and have already been described.
Figure 2:
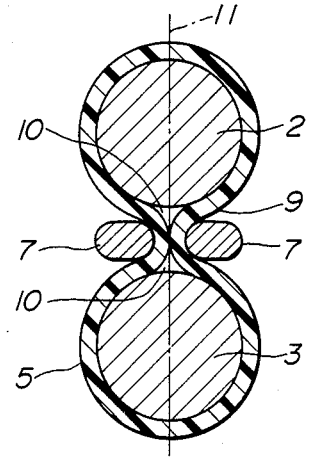
Figure 3:
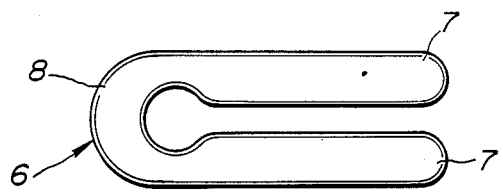

An envelope 45 is then wrapped around the insert/branch cable assembly and secured in place by clipping opposite edges of the envelope 45 along the cables 42a, 42b by means of clips 59. The envelope 45 used in this embodiment may be a conventional one, such as has been described earlier with reference to FIG. 1. Heat is applied to the envelope 45 to cause it to shrink and apply a compressive force to the assembly. The usual way of applying heat is to play a blow torch on the assembly from its outside. Heat is also applied to the flange 41a, 41b, for example, by ensuring that the play of the blow torch extends to the flanges 41a, 41b of the insert parts, which flanges 41a, 41b are outside the envelope 45. Heat applied to the flanges 41a, 41b is conducted along the flanges 41a, 41b and their respective tongues embed into the blocks 43a, 43b. Then heat is transmitted to the blocks 43a, 43b thus achieving satisfactory heating of the blocks 43a, 43b for fusing them.

As the envelope 45 shrinks, the fused blocks 43a, 43b will be compressed and deformed so as to fill the spaces 46 around the branch cables within the envelope 45. Of course, where the envelope is elongate, it is not necessary that the blocks 43a, 43b extend over the full length of the envelope 45. The dimensions of the block parts 43a, 43b are determined so that the quantity of fusible material is enough to fill tightly the space defined by the cables 42a, 42b and the envelope 45 after shrinkage. Provided that the spaces 46 are filled over at least part of the length of the envelope 45, then satisfactory sealing of the branch cables 42a, 42b will be achieved.

Figure 4:
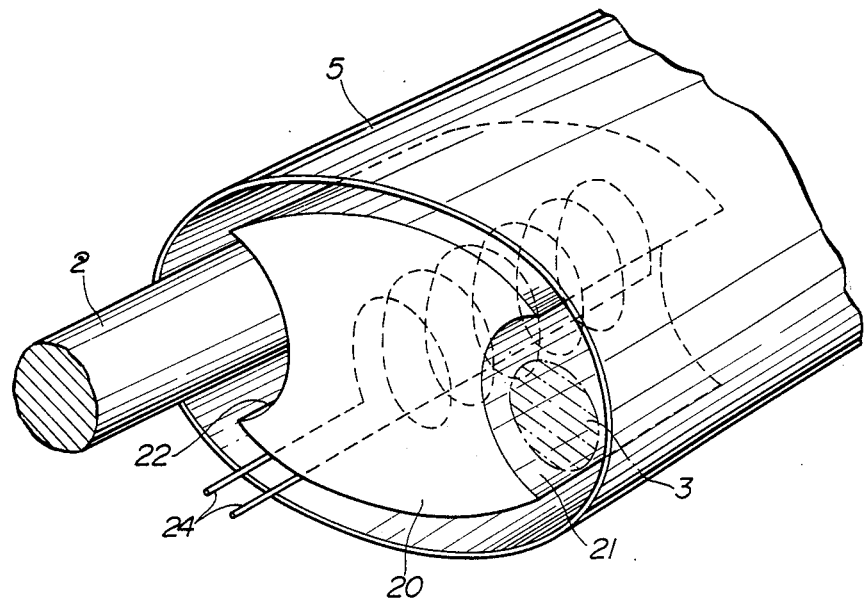
FIG. 4 shows a second known arrangement for sealing a cable branch junction, and has already been described.

The result is shown in FIG. 8 in which the block material 47 fills completely the space within the envelope 45. The result is, in many ways, similar to that known from the system described with reference to FIG. 4, but it should be noted that it has not been necessary to provide active heating of the block material, and thus the method of production is simplified.

By suitable choice of the material of the blocks 43a, 43b that material will fuse when the envelope 45 is heated, causing it to fuse and set to the cables and the envelope. The cable may be covered with the material that will fuse and set with the block material; this may for example, be a coating of material identical to the insert material, or a tape of fusible material would around the branch cables where the branch junction is to be formed.

The embodiment of FIGS. 5 to 8 may be further modified by forming the blocks of the insert parts from a material which expands on heating. Then, the blocks need not initially extend beyond the tangential lines of the branch cables, but will expand on heating against the shrinking envelope, and so be compressed around the cables.

It should also be noted that FIGS. 5 to 8 illustrate branch cables of the same diameter, but it is possible to align branch cables of different diameters in exactly the same way.

Figure 9:
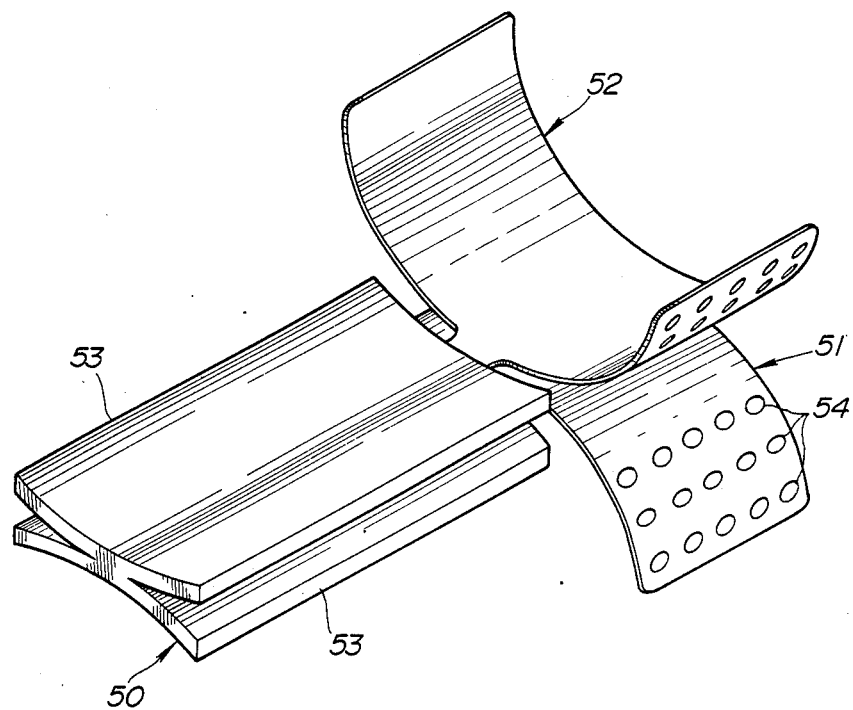
FIG. 9 shows a second embodiment of an insert part according to the present invention.

FIG. 9 shows a second insert part which is, in a short, a pair of insert parts shown in Fig. 7 connected to each other along central ridgelines of the block parts 32 so that the pair of constitutional insert parts are symmetrical to each other regarding a plane passing the ridgelines and tangential to the block parts 32. The block 50, of heat-fusible resin, is connected to two flanges by corresponding tongues 61 (not shown) extending from those flanges 51, 52. As can be seen, the block 50 is defined by a pair of generally rectangular block parts 53 which are connected together along a central line of one of their faces, in a direction generally parallel to the direction of the tongue 61. It can also be seen that the two block parts 53 are curved away from each other to give a measure of conformity to the branch cables between which they are to be fitted.

The flanges 51, 52 of the insert part may, as shown, each be generally similar to the flange of the insert part of FIG. 5, but as illustrated, spots 54 of a temperature-indicating paint (heat-sensitive paint) may be provided on their opposed surfaces, which surfaces will be outermost when the flanges 51, 52 are wrapped around the branch cables. Such heat-sensitive paint may also be used on the flanges 31 of the insert part shown in FIG. 5.

Figure 10:
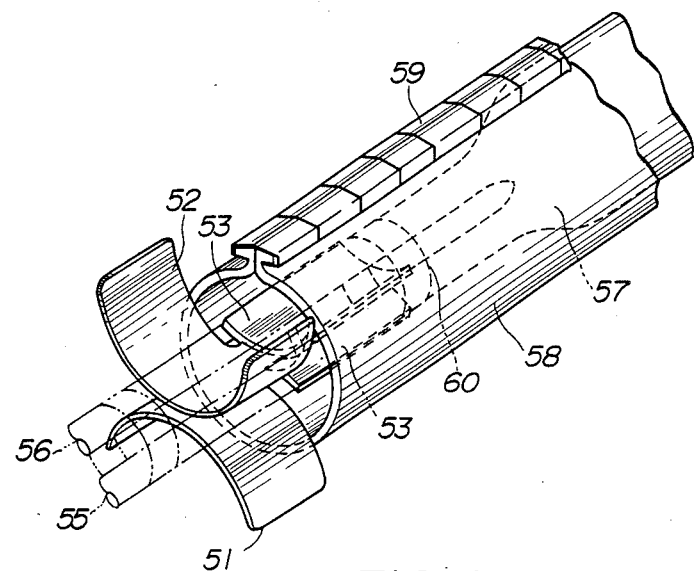
FIG. 10 shows a perspective view of the insert part of FIG. 9 fitted between two branch cables, and enclosed in a shrinkable envelope.

As shows in FIG. 10, the insert part of FIG. 9 is positioned between two branch cables 55, 56 extending from a branch junction 57, and enclosed within a heat-shrinkable envelope 58, with the flanges 51, 52 projecting therefrom.

As shown in FIG. 10, the envelope 58 is formed by wrapping a sheet of a material which is shrinkable radially inwards around the junction, and then clipping its free edges together by suitable clips 59. Such clips 59 are also shown in FIGS. 7 and 8.

Furthermore, in order to hold the branch cables 55, 56 in place, adhesive tape 60 may be wrapped around them adjacent the junction 57.

Figure 11:
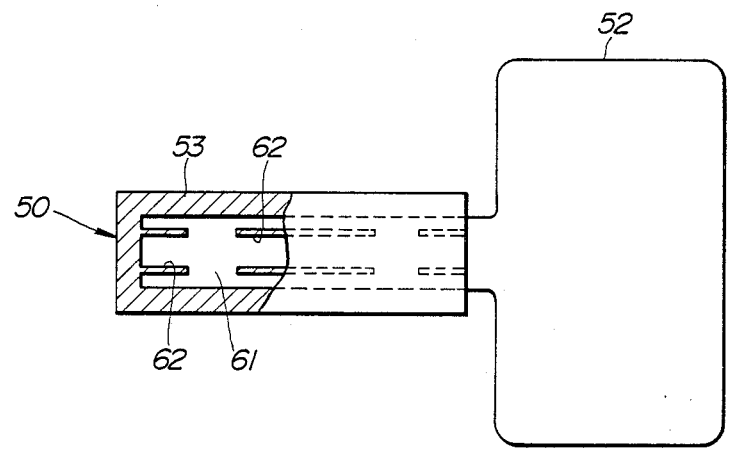
FIG. 11 shows a detail of the insert part of FIG. 9.

FIG. 11 illustrates a development of the insert part of FIG. 9, which is also applicable to the insert part of FIG. 5. In this development, the tongue 61 projecting from the flange 51 (and also the tongue projecting from the flange 52) have slots 62 formed therein through which the material of the block 50 extends. In this way, the block material is secured to the tongue 61 so that the heat is transmitted to the block 50 by the tongue 61.

The sealing of a branch junction by an insert part described with reference to FIGS. 9 to 11 will now be described with reference to FIGS. 12 and 13. In fact, the arrangement is very similar to that described in FIGS. 7 and 8, in that the envelope 58, and the flanges 51, 52 (not shown) of the insert parts are heated, causing the envelope 58 to shrink until it has reached a position in which it bears on the outer edges of the block parts 53. Then, conduction of heat from the flanges 51, 52 (not shown) along the tongues 61 from those flanges causes the block material to melt, thereby permitting further shrinkage of the sleeve 58 with the block material filling the spaces 63. The result is shown in FIG. 13, in which block material 64 entirely fills the volume within the envelope 58 between the branch cables 55, 56.

FIG. 14 shows a further modification of the block parts 53. In this modification, the outer edges 65 of the block parts 53 are thicker (in a direction perpendicular to the plane of the flanges 52, 52 (not shown) and the tongue 61) so that there is more block material where it will be needed, rather than between the branch cables 55, 56 where it is less necessary.

Figure 15:
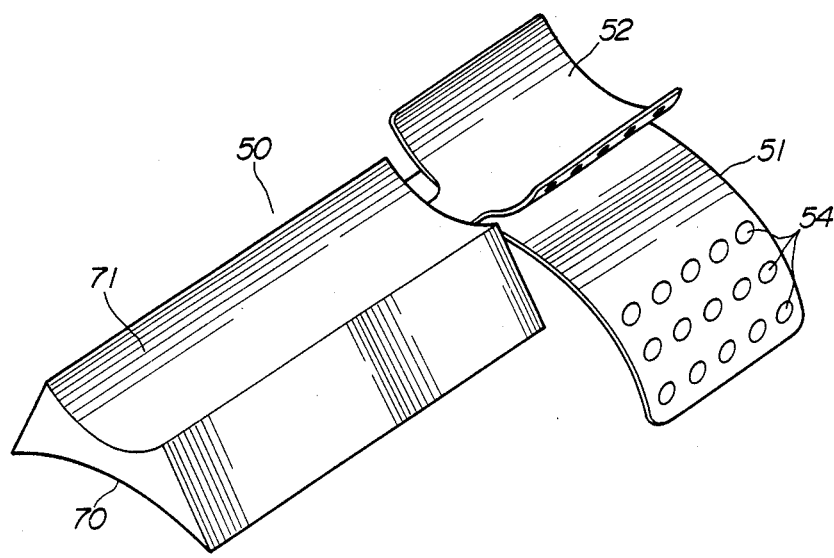
FIG. 15 shows another embodiment of an insert part according to the present invention.

FIG. 15 shows a further embodiment of an insert part according to the present invention, being a modification of the insert part of FIG. 9. In this modification, the flanges, tongues, etc. may be identical to those shown in FIG. 9 and will not be described in detail now. The difference, however, is that the block 50 has curved surfaces 70, 71 which receive the branch cables when the insert is fitted between those branch cables. It can also be seen from FIG. 15 that the branch cables need not be the same size, and by suitable curvature of the surface 70, 71, different sizes cables can be accommodated.

Another embodiment of the present invention will now be described with reference to FIGS. 16 to 20. This embodiment is particularly appropriate when the branch cables are large.

Figure 16:
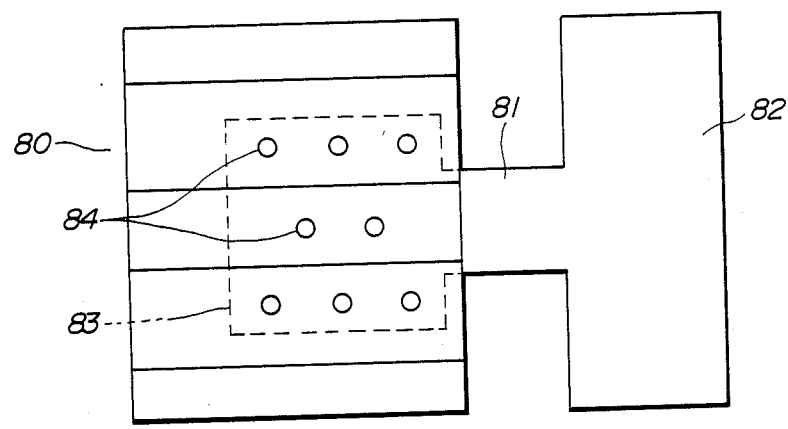
FIG. 16 shows yet another insert part according to the present invention.

Referring first to FIG. 16, an insert part has a block attached by a tongue 81 to a flange 82. The block 80 is preferably of thermoplastics material, and the tongue 2 and flange 3 are preferably of aluminium. As can be seen from FIG. 16, the end 83 of the tongue 81 which is within the block may be wider than other parts of the tongue 81, to ensure good bonding of the block material to the tongue 81. To improve this bonding further, through-holes 84 may be provided in the end 83 of the tongue 81, through which block material will extend, securing the block 80 to the tongue 81. This is similar to the function of the slots 62 in FIG. 11. It may also be noted that this widening 83 of the tongue 81 may also be applied to the embodiment of FIG. 5, provided that the total width of the tongue is not so large as to cause it to project beyond the theoretical tangential lines joining the branch cables.

Figure 17:
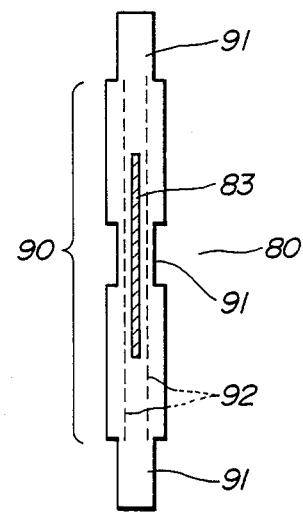
FIG. 17 shows a cross-sectional view of the insert part of FIG. 16.

As can be seen from FIG. 17, the block has a central region 90, at least part of which has a first thickness, and side regions 91 which are thinner. In this embodiment, thickness refers to the direction perpendicular to the plane of the flange and tongue, length refers to the direction parallel to the direction of extension of the tongue 81 from the flange 82, and the plane of the tongue and the flange, and width refers to the direction perpendicular to the direction of extension of the tongue 81, again in the plane of the tongue and the flange.

Collapsible meshes (or foils) 92 which are preferably made of aluminium for good conduction of heat and flexibility, are embedded in the block 80 and (as shown) lie substantially parallel to the wider part 83 of the tongue. The meshes 92 extend the full width of the central part 90 of the black 80, and indeed may extend into the thinner side regions 91, to help conduct heat towards the edges of the block. The meshes 92 deform when the heat-shrinkable sleeve tightens around them.

The purpose of providing the thinner side regions 91 is that they soften earlier than would be the case if they were the same thickness as the central region 10. This early softening permits the side regions 91 to deform more rapidly with the shrinkage of the sleeve. Also, as can be seen from FIG. 17, the central region 90 itself has a thinner part 91 in the middle thereof, as it is not necessary that this part contains a large volume of block material.

Figure 18:
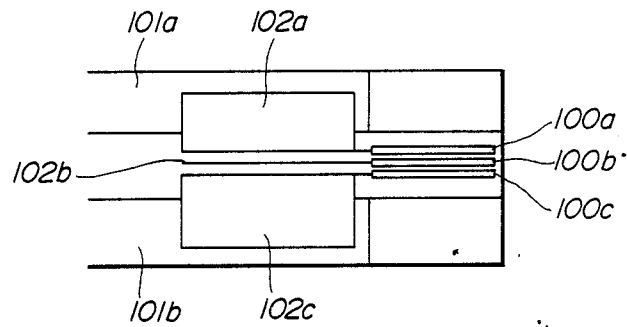
FIG. 18 shows three insert parts as shown in FIG. 16 positioned between two branch cables.

In use, one or more such insert parts are placed between branch cables to be sealed. The arrangement of FIGS. 5 to 8 discuss the use of two insert parts, but FIG. 18 shows the use of three insert parts, which may be the same as in FIG. 16 or 17, or possibly as shown in FIG. 5. For very large branch cables, four or more insert parts may be necessary. The three insert parts 100a, 100b, 100c are placed adjacent each other between the branch cables 101a, 101b, and the flanges 102a, 102c of the outer two insert parts are each wrapped around the corresponding adjacent branch cable 101a, 101b. The flange 102b of the central insert part is not deformed.

Figure 19:
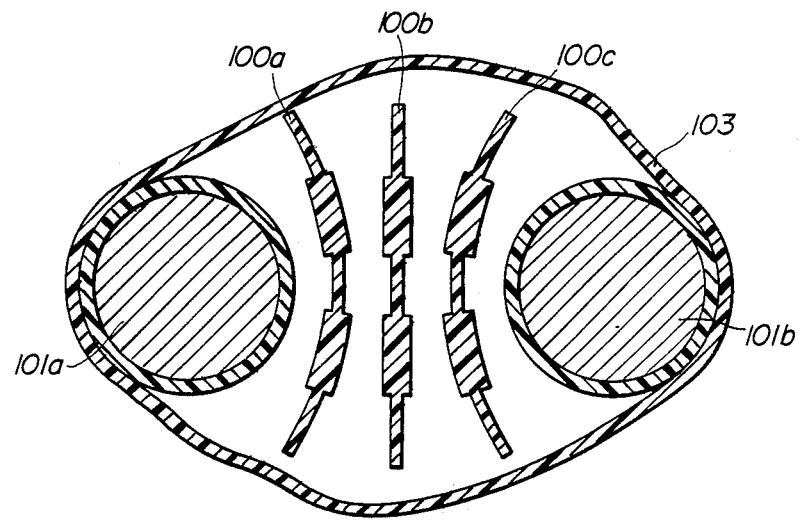
FIG. 19 shows a cross-sectional view through the branch cables of FIG. 18, prior to shrinkage of the envelope.

Then, as shown in FIG. 19, a heat-shrinkable enveloped 103 is wrapped around the branch cables 101a, 101b and the blocks 100a, 100b, 100c of the insert parts. Heat is applied to the envelope 103 and also the flanges 102a, 102b, 102c to cause the envelope 103 to shrink and also cause the blocks 100a, 100b, 100d to soften.

Figure 20:
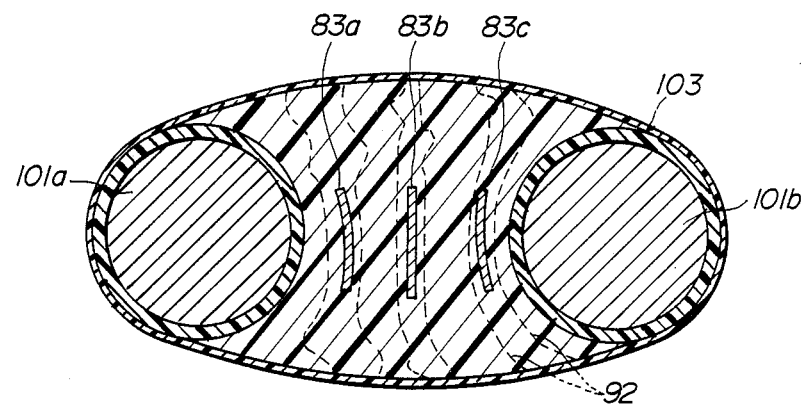
FIG. 20 shows a cross-sectional view corresponding to FIG. 19, but after shrinkage of the envelope.

The heating is continued until the stage shown in FIG. 20 is reached, in which the envelope 103 conforms closely to the tangential lines joining the branch cables 100a, 100b, and the interior of the envelope 103 is filled with material from the blocks 100a, 100b, 100c. FIG. 5 also shows the ends 83a, 83b, 83c of the tongues of the insert parts and the deformed meshes 92 lying between the branch cables 101a, 101b.

Apart from the details of the shape of the blocks, the manner in which better heat conduction is achieved through the blocks, and the number of insert parts used, the sealing of cable junctions described in this embodiment is similar to that described for the other embodiments, and therefore developments also discussed with reference to those embodiments may be used with the insert parts of this embodiment. For example, as mentioned above, it is not necessary that the blocks of the insert parts extend over the full length of the envelope.

Provided that the space within the envelope 103 is filled over at least a part of the length of the envelope 103, then satisfactory sealing of the branch cables will be achieved.

What is claimed is:

1. An insert part for sealing a cable junction, said insert part comprising:
   (a) a block of heat-fusible material, said block having a central region and outer regions on opposite sides of said central region;
   (b) a flange of heat-conductive material located beyond one of said ends of said block, said flange being planar;
   (c) a tongue of heat-conductive material connecting said flange to said block, said tongue being formed by a single component extending only into said block from said flange; and
   wherein at least a part of said central region of said block is thicker in a direction perpendicular to the plane of said flange than said outer regions.

2. An insert part according to claim 1, wherein said central region has a part which is thinner in a direction perpendicular to said flange than the other parts of said central region.

3. An insert part for sealing a cable junction according to claim 1, wherein temperature sensing means are provided on the flange so that the temperature thereof is indicated while the flange is being heated.

4. An insert part according to claim 1, having another flange connected to said block.

5. An insert part according to claim 1, wherein said block has at least one collapsible heat-conducting member.

6. An insert part for sealing an open end of a tubular heat-shrinkable envelope enclosing a cable branch from which at least two branch cables extend through the open end generally parallel to each other, said insert part comprising:
   (a) a block of heat-fusible material having opposite concave side faces, said block being adapted to be interposed between two branch cables with said concave side faces fitted to the two branch cables;
   (b) at least two tongues of heat-conductive material, one end of each of said at least two tongues being embedded in the block, the other end of each of said at least two tongues being extended out of the block;
   (c) at least two flanges of heat-conductive material which are curved and connected to said other end of respective tongues at a central portion thereof, extending approximately perpendicular to the tongue, being disposed so that the at least two flanges are curved away from each other to hold respective branch cables in a concavity thereof in a spaced relation;
   whereby upon application of heat to said flanges and the heat-shrinkable envelope, the heat is transferred from said flanges to the respective tongues and the heat-fusible block causing said block to undergo fusion, and the envelope is shrunk radially inward as the block undergoes fusion to fill the space between the envelope and the branch cables, and thereby to seal the open end of the envelope.

7. An assembly for sealing a cable junction having at least first and second branch cables, the assembly comprising:
   (a) an insert having at least three insert parts, comprising a first outer insert part, a second outer insert part, and at least one central insert part, each insert part comprising a flange of heat conductive material and a block of heat fusible material connected to said flange, wherein said at least three insert parts are disposed such that said at least one central insert part is between said first and second outer insert parts, and the insert is positionable to dispose said block between first and second branch cables of a cable at a junction, wherein the flange of said first outer insert part is deformed concavely to one branch cable and the flange of said second outer insert part is attachable to another branch cable; and
   (b) a heat shrinkable envelope disposable around first and second branch cables, and wherein at least a part of said blocks are within said envelope.

8. An assembly according to claim 7 wherein said block of said at least three insert parts project beyond the theoretical tangential lines joining said first and second branch cables.

9. An assembly according to claim 7 wherein said at least three blocks have a central region and outer regions on opposite sides of said central region, at least a part of each said central region being of a first thickness in the direction of the line joining the centers of the branch cables, and said outer regions have a thickness in said direction less than said first thickness.

10. An assembly according to claim 9 wherein said at least three central regions have a part with a thickness in said direction which is less than said first thickness.

11. An assembly according to claim 7, wherein said block of said at least three insert parts has a higher melt-flow index and a lower melting point than the material of said envelope.

12. An assembly according to claim 7, wherein said flange of each insert part is connected to said block of each insert part by a tongue of heat-conductive material, said tongue extending from said flange of each insert part into said block on insert part of each insert part, and which has through holes therein, and said material of said block extends through said holes.

13. An assembly according to claim 7, wherein each block of said at least three insert parts has at least one collapsible heat-conducting member therein.

14. An assembly for sealing a cable junction having at least first and second branch cables, the assembly comprising:
   an insert positioned between first and second branch cables of a cable at a cable junction, said insert having at least one insert part comprising a flange of heat conductive material and a block of heat fusible material connected to said flange, said at least one insert part being positionable with said block between first and second branch cables, and said flange for attaching said at least one insert part of a corresponding one of the first and second branch cables;
   a heat shrinkable envelope disposable around the first and second branch cables, at least a part of said block being within said envelope; and
   wherein said block projects beyond the theoretical tangential lines joining first and second branch cables.

15. An assembly according to claim 14 wherein said insert has at least three of said insert parts, being a first outer part, a second outer part, and at least one central part, said at least one central insert part being between said first and second outer insert parts, the flange of said first outer part being attached to said first branch cable, and the flange of said second outer part being attached to said second branch cable.

16. An assembly for sealing a cable junction having at least first and second branch cables, the assembly comprising:
   (a) an insert comprising a block of heat-fusible material having opposite side faces, said block being adapted to be interposed between two branch cables; and at least two tongues of heat-conductive material, one end of each thereof being embedded in the block, the other end thereof being extended out of the block; and at least two flanges of heat-conductive material which are curved and connected to said other end of respective tongues at a central portion thereof, extending approximately perpendicular to the tongue, being disposed to that the flanges are curved away from each other to hold respective branch cables in a concavity thereof in a spaced relation; and
   (b) a heat shrinkable envelope to be disposed around said first and second branch cables and disposed so that at least a part of said block is within said envelope.

17. An assembly for sealing a cable junction having at least first and second branch cables, the assembly comprising:
   an insert positioned between said first and second branch cables, said insert having two insert parts, each of said insert parts comprising a flange of heat conductive material and a block of heat fusible material connected to said flange, said two insert parts being positioned between said first and second branch cables with the blocks of said two insert parts adjacent each other, said flange of one of said two insert parts being attached to said first branch cable and said flange of the other of said two insert parts being attached to said second branch cable; and
   a heat shrinkable envelope around said first and second branch cables, at least a part of said blocks of each insert part being within said envelope;
   wherein said block of each insert part projects beyond the theoretical tangential lines joining said first and second branch cables.

18. An assembly for sealing a cable junction having at least first and second branch cables, the assembly comprising:
   an insert positioned between said first and second branch cables, said insert having at least one insert part comprising a flange of heat conductive material and a block of heat fusible material connected to said flange, said at least one insert part being positioned with said block between said first and second branch cables, and said flange attaching said at least one insert part to a corresponding one of said first and second branch cables; and
   a heat shrinkable envelope around said first and second branch cables, at least a part of said block being within said envelope;
   wherein said block projects beyond the theoretical tangential lines joining said first and second branch cables and said at least one insert part has a further flange, said further flange being deformed concavely to the other corresponding one of said first and second branch cables.

19. An assembly for sealing a cable junction having at least first and second branch cables, the assembly comprising:
   an insert positioned between said first and second branch cables, said insert having at least one insert part comprising a flange of heat conductive material and a block of heat fusible material connected to said flange, said at least one insert part being positioned with said block between said first and second branch cables, and said flange attaching said at least one insert part to a corresponding one of said first and second branch cables; and
   a heat shrinkable envelope around said first and second branch cables, at least a part of said block being within said envelope;
   wherein said block projects beyond the theoretical tangential lines joining said first and second branch cables and said block of said at least one insert part has a higher melt flow index and a lower melting point than the material of said envelope.

20. An assembly for sealing a cable junction having at least first and second branch cables, the assembly comprising:
   an insert positioned between said first and second branch cables, said insert having at least one insert part comprising a flange of heat conductive material and a block of heat fusible material connected to said flange, said at least one insert part being positioned with said block between said first and second branch cables, and said flange attaching said at least one insert part to a corresponding one of said first and second branch cables; and
   a heat shrinkable envelope around said first and second branch cables, at least a part of said block being within said envelope;
   wherein said block projects beyond the theoretical tangential lines joining said first and second branch cables and said tongue has through holes therein, and said material of said block extends through said holes.

21. An assembly for sealing a cable junction having at least first and second branch cables, the assembly comprising:
   an insert positioned between said first and second branch cables, said insert having at least one insert part comprising a flange of heat conductive material and a block of heat fusible material connected to said flange, said at least one insert part being positioned with said block between said first and second branch cables, and said flange attaching said at least one insert part to a corresponding one of said first and second branch cables; and a heat shrinkable envelope around said first and second branch cables, at least a part of said block being within said envelope;
   wherein said block projects beyond the theoretical tangential lines joining said first and second branch cables and said block has a central region and outer regions on opposite sides of said central region, at least a part of said central region being of a first thickness in the direction of the line joining the centers of the branch cables, and said outer regions having a thickness in said direction less than said first thickness.

22. An assembly according to claim 21, wherein said central region has a part with a thickness in said direction which is less than said first thickness.

23. An assembly for sealing a cable junction having at least first and second branch cables, the assembly comprising:
- an insert positioned between said first and second branch cables, said insert having at least one insert part comprising a flange of heat conductive material and a block of heat fusible material connected to said flange, said at least one insert part being positioned with said block between said first and second branch cables, and said flange attaching said at least one insert part to a corresponding one of said first and second branch cables; and
- a heat shrinkable envelope around said first and second branch cables, at least a part of said block being within said envelope;
- wherein said block projects beyond the theoretical tangential lines joining said first and second branch cables and said block has at least one collapsible heat-conducting member therein.

24. A method for sealing a cable junction having at least first and second branch cables, the method comprising the steps of:
- (a) positioning an insert between first and second branch cables of a cable at a junction, said insert having at least three insert parts, comprising a first outer insert part, a second outer insert part, and at least one central insert part, each insert part comprising a flange of heat conductive material and a block of heat fusible material connected to said flange, said at least three insert parts being positioned with said block between said first and second branch cables so that said at least one central insert part is between said first and second outer insert parts, and the flange of said first outer insert part is deformed concavely to said first branch cable and the flange of said second outer insert part is attached to said second branch cable;
- (b) surrounding said first and second branch cables with a heat shrinkable envelope, said blocks being at least partially within said heat shrinkable envelope; and
- (c) applying heat to said envelope and to said flange, to thereby cause said blocks to fuse within said envelope.

25. A method for sealing a cable junction having at least first and second branch cables, the method comprising the steps of:
- (a) positioning an insert between at least first and second branch cables of a cable at a junction, said insert having at least one insert part comprising a flange of heat conductive material and a block of heat fusible material connected to said flange, said at least one insert part being positioned with said block between said first and second branch cables and said flange attaching said at least one insert part to a corresponding one of said first and second branch cables;
- (b) surrounding said first and second branch cables with a heat shrinkable envelope, said block being at least partially within said heat shrinkable envelope; and
- (c) applying heat to said envelope and to said flange, to thereby cause said envelope to shrink and said heat fusible material of said block to fuse within said envelope, wherein at least during the shrinkage of the envelope and the block, said block of said at least one insert part projects beyond the theoretical tangential lines joining said first and second branch cables.

26. A method according to claim 25, wherein there are two insert parts, and said positioning step comprises positioning said two insert parts between said first and second branch cables with the blocks of said two insert parts being shaped concavely to said first branch cable and the flange of the other of said two insert parts being shaped concavely to said second branch cable.

27. A method according to claim 25, wherein said at least one insert part has an additional flange, and said positioning step includes concavely warping said additional flange to the corresponding one of said first and second branch cables.

28. A method according to claim 25, wherein said block of said at least one insert part has a higher melt flow index and a lower melting point than the material of said envelope, whereby during the step of applying heat, said material of said block undergoes fusion prior to said shrinking of said envelope.

29. A method for sealing a cable junction having at least first and second branch cables, the method comprising the steps of:
- (a) positioning an insert between first and second branch cables of a cable at a junction thereof, said insert having at least one insert part, the at least one insert part having a block of heat fusible material and two flanges including a first flange and a second flange both of heat conductive material and connected to said block, wherein said insert is positioned with said block between said first and second branch cables and said first and second flanges being concave toward said first and second branch cables, respectively;
- (b) surrounding said first and second branch cables with a heat shrinkable envelope, said block being at least partially disposed within said envelope; and
- (c) applying heat to said envelope and to said flanges, to thereby cause said envelope to shrink and said heat fusible material of said block to fuse within said envelope.

30. A method for sealing a cable junction according to claim 29, wherein:
- said each flange is generally in a T-shaped form comprising a tongue portion and a flange portion, one end of the tongue portion being connected perpendicularly to a mid part of the flange portion, at least a portion of the tongue portion being embedded in the block, the tongue portions of the respective flanges being disposed parallel to each other, the flange portions of the respective flanges curving so that the flange portions coming apart from each other as it goes from the mid part to both ends, the radius of the curvature of the flange portions being larger than a curvature of said branch cables so that the flange portions are distant from the branch cables at least at their distal portions;
- said branch cables are surrounded by the heat shrinkable envelope so that the flanges extrude out of the envelope; and
- the heat for fusing the block of the at least one insert part is applied from a direction facing to a pair of convex surfaces of respective flange protions, the convex surfaces facing to each other, so that the branch cables are hidden by the flange portions to avoid that the heat is applied directly to the branch cables.

* * * * *

UNITED STATES PATENT AND TRADEMARK OFFICE
CERTIFICATE OF CORRECTION

PATENT NO. : 4,920,236

DATED : April 24, 1990

INVENTOR(S) : Makiyo et al.

It is certified that error appears in the above-identified patent and that said Letters Patent is hereby corrected as shown below:

Col. 10, claim 12  Delete " on insert part "
line 39

Col. 10, claim 12  After " block " insert -- of insert part --
line 41

Col. 11, claim 16  Delete second " to " and substitute -- so --
line 17

Signed and Sealed this

Fourth Day of February, 1992

*Attest:*

HARRY F. MANBECK, JR.

*Attesting Officer*    *Commissioner of Patents and Trademarks*